C. J. MOORE.
Car-Starters.

No. 141,159.  Patented July 22, 1873.

Witnesses
Thos H Hutchins
H. Lowe

Inventor
Clement J Moore

UNITED STATES PATENT OFFICE.

CLEMENT J. MOORE, OF JOLIET, ILLINOIS.

IMPROVEMENT IN CAR-STARTERS.

Specification forming part of Letters Patent No. 141,159, dated July 22, 1873; application filed February 7, 1873.

*To all whom it may concern:*

Be it known that I, CLEMENT J. MOORE, of the city of Joliet, in Will county and State of Illinois, have invented a new and Improved Device for Starting Cars, of which the following is a specification:

My invention consists in the use of certain levers, combined as hereinafter described, for the purpose of starting cars and moving them for short distances; and in order to enable others skilled in the art to make and use my invention, I will explain its construction and operation, reference being had to the annexed drawings making a part of this specification.

In the drawings, Figure 1 is a side elevation of the device applied to a car as it appears in operation; and Figs. 2 and 3 are plan views on the top of certain portions of the device, more particularly hereinafter set forth.

The device consists in the two parallel bars $a$ and $m$, connected together by means of the levers of the second kind $c$ and the pin $z$, passing through the slot $e$, in which it slides. The bar $m$ is intended to rest on the ground, and is bound with metal $o$, terminating in the serrated point $s$, made sharp so as to pierce the earth. $r$ is a stop fastened to the bar $m$ on the top side, near its point $s$, to prevent the point $s$ from entering the ground too far. $n$ is a step attached to the top of the bar $m$, near its lower end, for the purpose of furnishing a convenient place upon which to press the foot to hold the point $s$ down to its work, if inclined to slip on the hard earth. The bar $a$ is coupled, at its upper end, to the car B at the ordinary coupling A, as shown in Fig. 1.

The mode of operation is to place the device in the position, with respect to the car, as shown in Fig. 1, and then, by pressing toward the car A with the shoulder against the lever $c$, near its upper end, power enough is obtained to move any ordinary loaded car with the use of a single person.

Figure 1:
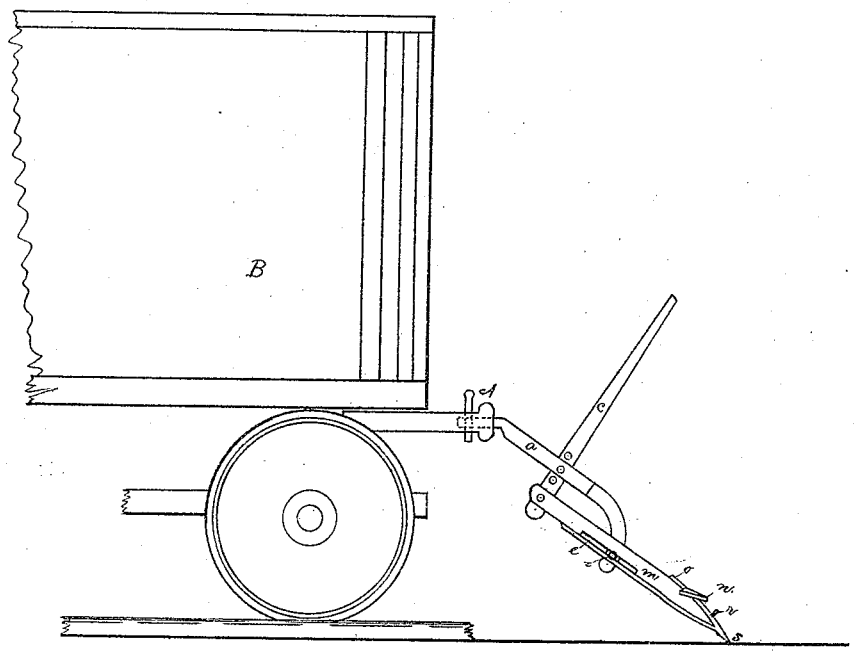
Figure 2:
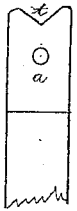
Fig. 2 is a plan view on the top of the bar $a$, showing a notch, $t$, which is used to place against the corner of a car to start the same when the device cannot be set so as to be coupled to the car, as shown, from the fact of the car being too near another, &c.
Figure 3:
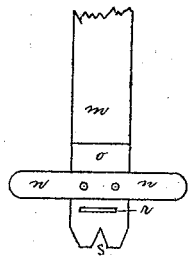
Fig. 3 is a plan view on the top of the bar $m$, to show more particularly the step $n$, position of the stop $r$, and serrated point $s$ before described. The lever $c$ is furnished with a row of holes, as shown in Fig. 1, so the leverage may be varied to suit circumstances and the strength of the operator.

By the use of this device engines, horses, &c., may be entirely dispensed with about the yard for the purpose of moving and switching cars, thus furnishing a simple and easy mode of accomplishing that which is ordinarily hard and expensive labor.

Having thus described my invention, what I claim as new, and desire to secure by Letters Patent, is as follows:

The bar $m$ having the metal binding $o$, serrated point $s$, step $n$, slot $e$, and stop $r$, in combination with the bar $a$ and lever $c$, arranged and operating in the manner and for the purpose set forth.

CLEMENT J. MOORE.

Witnesses:
THOS. H. HUTCHINS,
J. M. BROWNE.